United States Patent [19]

Fredericks

[11] Patent Number: 5,075,999

[45] Date of Patent: Dec. 31, 1991

[54] HUNTING DECOY APPARATUS

[76] Inventor: William M. Fredericks, 922 Elizabeth St., Ogdensburg, N.Y. 13669

[21] Appl. No.: 612,548

[22] Filed: Nov. 13, 1990

[51] Int. Cl.$^5$ ............................................. A01M 31/06
[52] U.S. Cl. ................................................. 43/1; 43/2; 135/901
[58] Field of Search ..................... 43/1, 2, 3; 135/901

[56] References Cited

U.S. PATENT DOCUMENTS

| | | | |
|---|---|---|---|
| 4,581,837 | 4/1986 | Powlus | 43/2 X |
| 4,683,672 | 8/1987 | Davis | 135/901 X |
| 4,794,717 | 1/1989 | Horsmann | 135/901 X |
| 4,829,694 | 5/1989 | Oasheim | 43/1 |

Primary Examiner—Richard K. Seidel
Assistant Examiner—Patty E. Hong
Attorney, Agent, or Firm—Leon Gilden

[57] ABSTRACT

An apparatus wherein a housing includes a right and left door overlying the housing, the housing configured to camouflage a hunter interiorly thereof positioned within an "L" shaped seat within the housing. The doors include cooperating mesh portions to permit a viewing of the hunter through the mesh portions of the mesh portion overlying the seat.

1 Claim, 4 Drawing Sheets

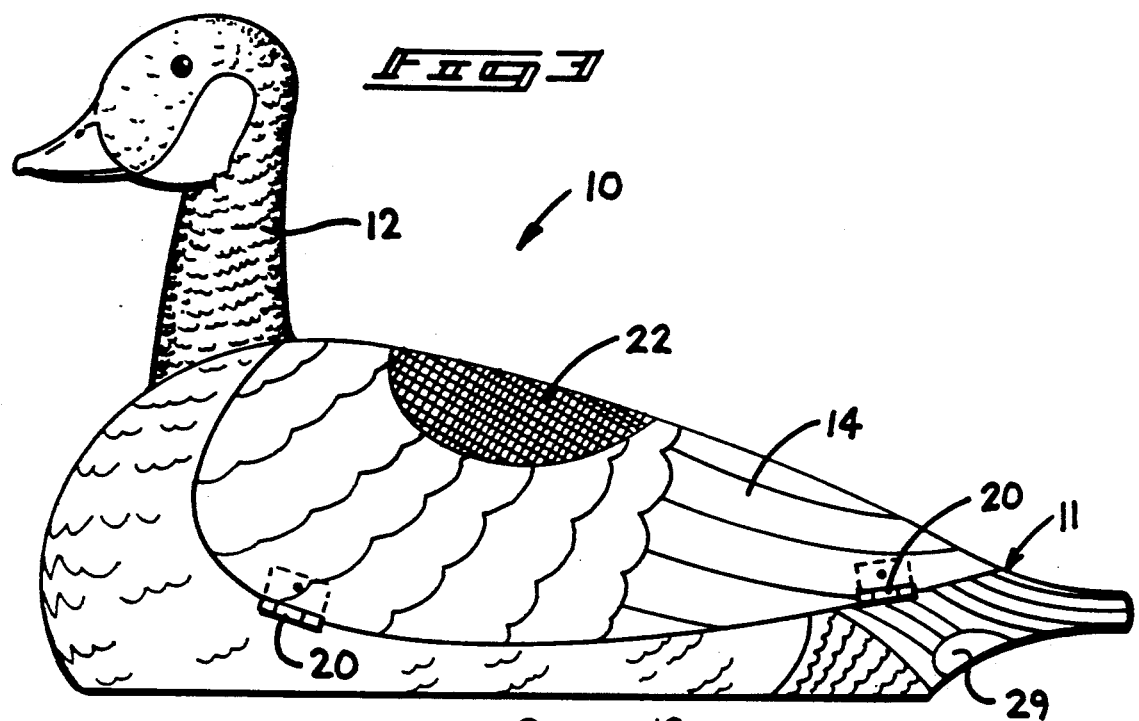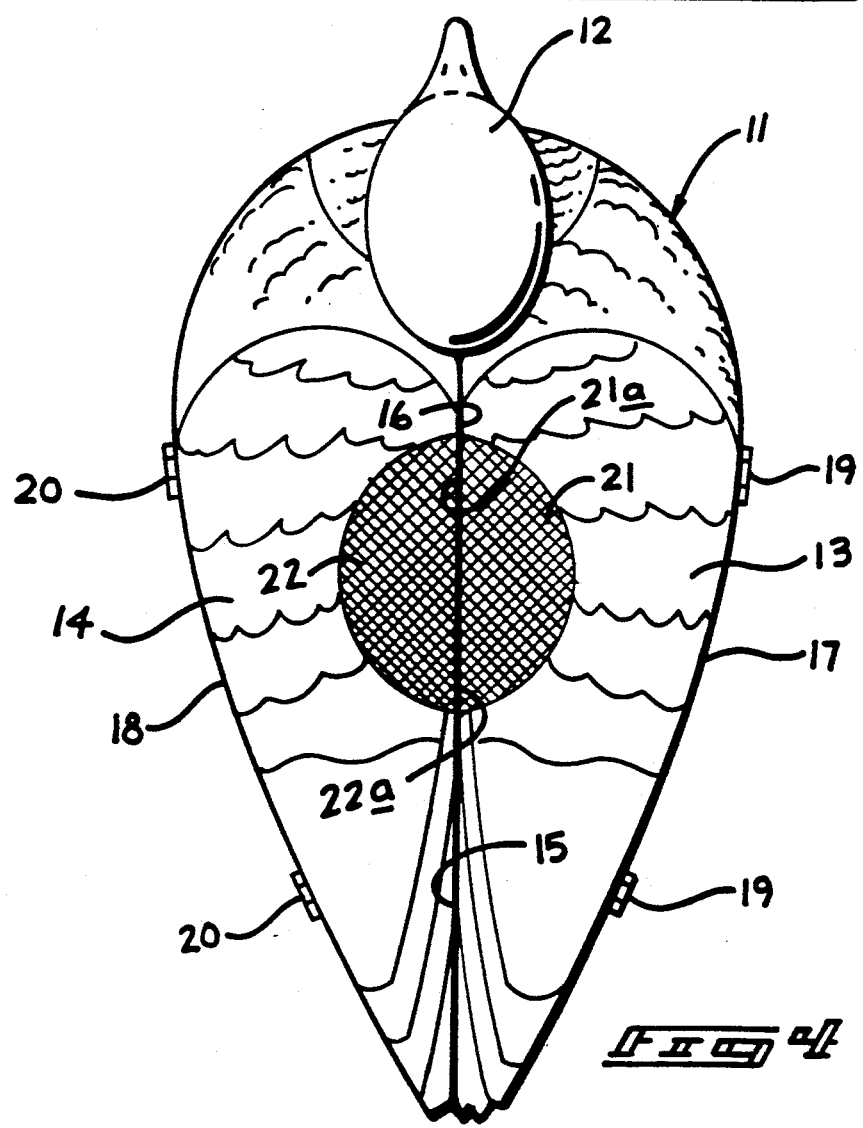

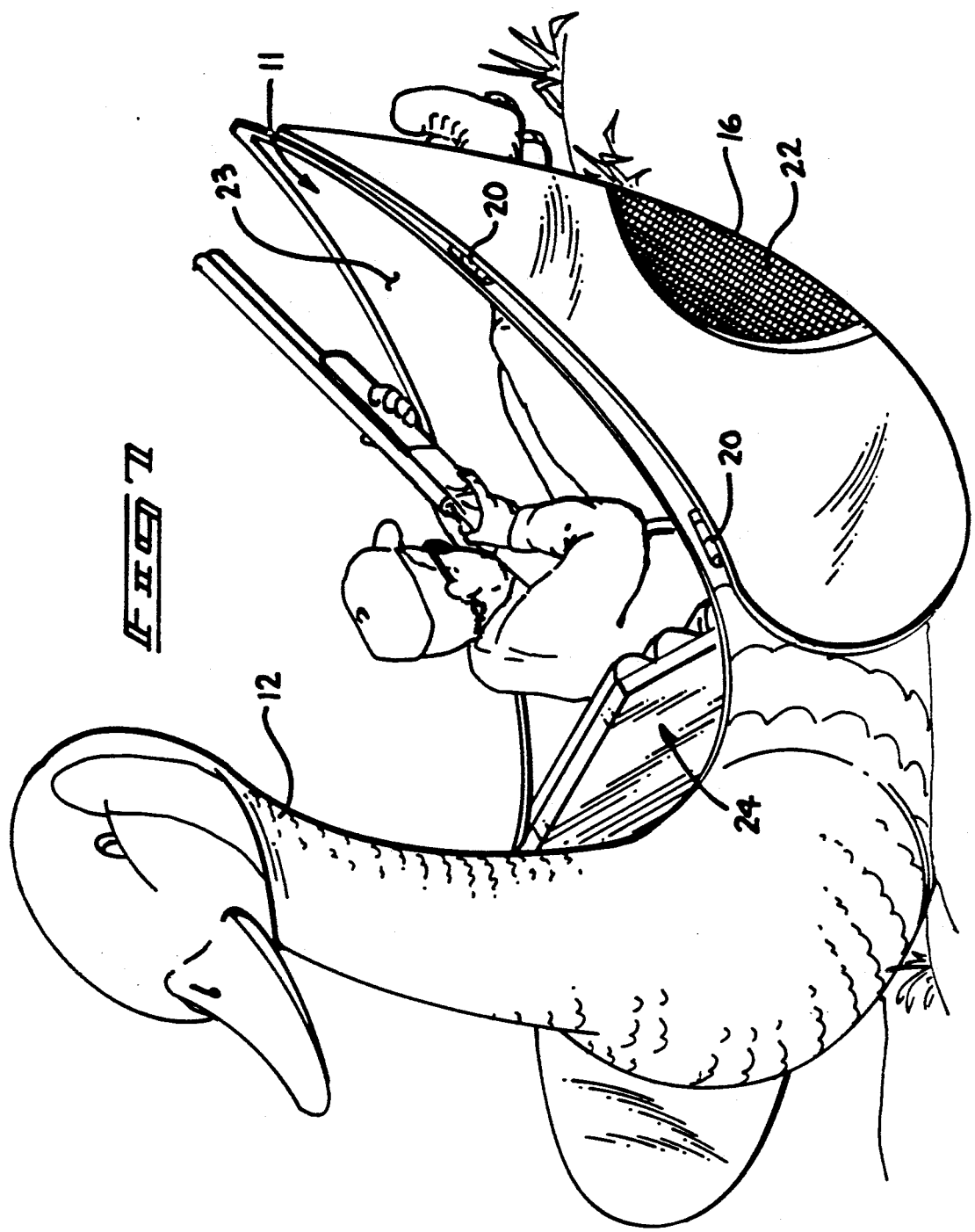

HUNTING DECOY APPARATUS

BACKGROUND OF THE INVENTION

1. Field of the Invention

The field of invention relates to decoy apparatus, and more particularly pertains to a new and improved hunting decoy apparatus wherein the same is arranged to position wing panels overlying a hollow housing, with a viewing screen mesh mounted within the wings to permit viewing from within the housing.

2. Description of the Prior Art

Various decoy apparatus has been set forth in the prior art to provide concealment for hunters and inducement for various hunting game to be attracted to the organization. The instant invention has attempted to overcome deficiencies of the prior art by providing a decoy apparatus arranged to permit an individual to be positioned therewithin to induce water fowl to be directed toward the decoy while further concealing a hunter interiorly therewithin in a totally enclosed manner. Examples of the prior art include U.S. Pat. No. 4,885,861 to Gazalski provides a hollow shell decoy with foot portions mounted to the decoy for permitting filling of the foot portions with weighted material, such as sand and the like.

U.S. Pat. No. 4,689,913 to Brice sets forth a collapsible decoy wherein a framework formed of wire-like structure mounts an overlying skin thereon.

U.S. Pat. No. 3,800,457 to Barrett sets forth a water fowl decoy arranged for automatically facing into the wind in balancing of the decoy upon a peg member.

U.S. Pat. No. 4,651,458 to Lanius sets forth a bird decoy that may be assembled into a feeder or sentry position by displacement and repositioning of the neck relative to the body.

U.S. Pat. No. 4,893,428 to Gagnon sets forth a further example of a self-lining decoy, wherein a socket is mounted substantially at a center of gravity with a mounting stake provided to permit turning and motion of the decoy to simulate a water fowl.

As such, it may be appreciated that there continues to be a need for a new and improved hunting decoy apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of decoy apparatus now present in the prior art, the present invention provides a hunting decoy apparatus wherein the same provides a housing for concealment of a hunter therewithin prior to opening of doors overlying the cavity of the housing to permit a hunter access to water fowl and the like. As such, the general purpose of the present invention, which Will be described subsequently in greater detail, is to provide a new and improved hunting decoy apparatus which has all the advantages of the prior art hunting decoy apparatus and none of the disadvantages.

To attain this, the present invention provides an apparatus wherein a housing includes a right and left door overlying the housing, the housing configured to camouflage a hunter interiorly thereof positioned within an "L" shaped seat within the housing. The doors include cooperating mesh portions to permit a viewing of the hunter through the mesh portions of the mesh portion overlying the seat.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hunting decoy apparatus Which has all the advantages of the prior art hunting decoy apparatus and none of the disadvantages.

It is another object of the present invention to provide a new and improved hunting decoy apparatus which may be easily and efficiently manufactured and marketed.

It is a further object of the present invention to provide a new and improved hunting decoy apparatus which is of a durable and reliable construction.

An even further object of the present invention is to provide a new and improved hunting decoy apparatus which is susceptible of a low cost of manufacture with regard to both materials and labor, and which accordingly is then susceptible of low prices of sale to the consuming public, thereby making such hunting decoy apparatus economically available to the buying public.

Still yet another object of the present invention is to provide a new and improved hunting decoy apparatus which provides in the apparatuses and methods of the prior art some of the advantages thereof, while simultaneously overcoming some of the disadvantages normally associated therewith.

Still another object of the present invention is to provide a new and improved hunting decoy apparatus wherein the same sets forth a concealment housing for positioning a hunter therewithin, with store structure overlying a cavity of the housing pivotally mounted relative to the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view, taken in elevation, of the instant invention.

FIG. 4 is an orthographic top view of the instant invention.

FIG. 7 is an isometric illustration of the instant invention with the wing doors in a second open position from a first position, as illustrated in FIG. 4.

DESCRIPTION OF THE PREFERRED EMBODIMENT

Figure 1:
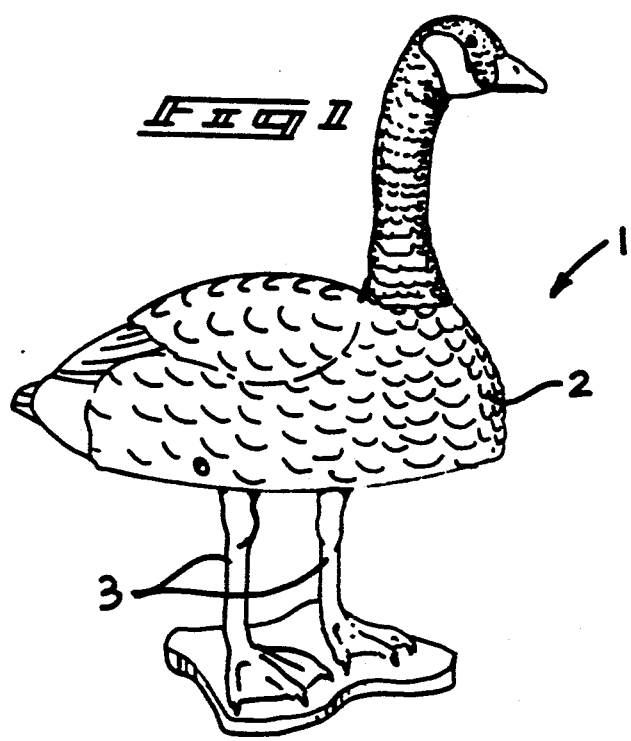
FIG. 1 is an isometric illustration of a prior art hunting decoy.

With reference now to the drawings, and in particular to FIGS. 1 to 7 thereof, a new and improved hunting decoy apparatus embodying the principles and concepts of the present invention and generally designated by the reference numeral 10 will be described.

Figure 2:
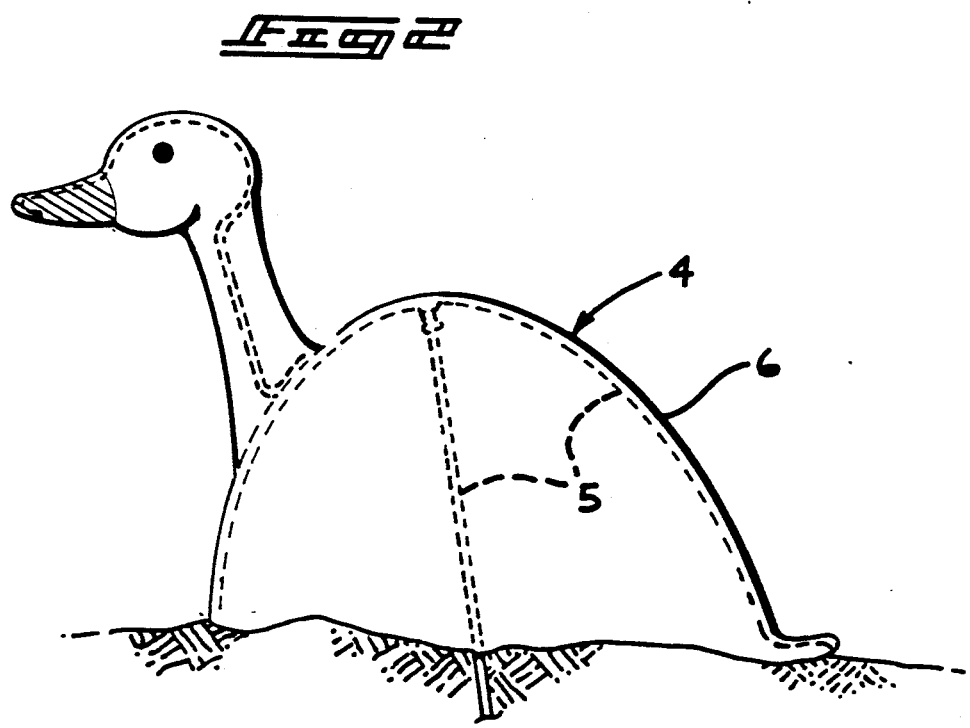
FIG. 2 is an orthographic side view, taken in elevation, of a further example of a hunting decoy.
Figure 5:
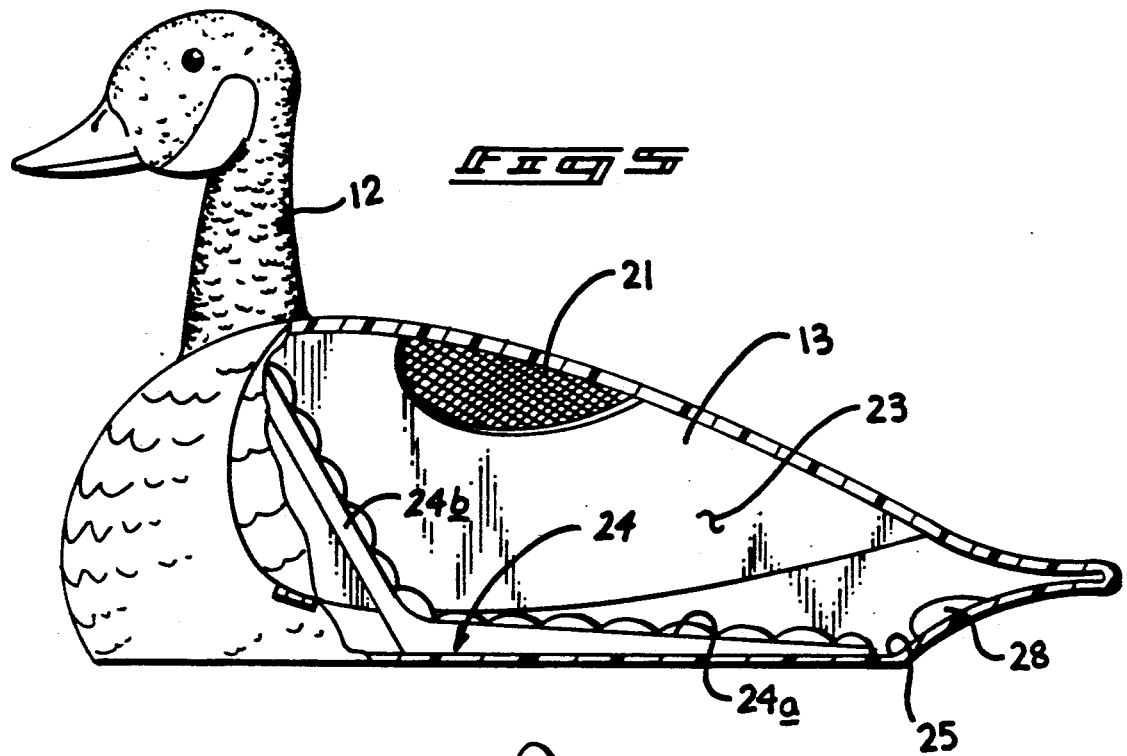
FIG. 5 is an orthographic side view, taken in elevation, partially in section, of the instant invention.

FIG. 1 illustrates a prior art hunting decoy 1, wherein the body 2 includes leg members 3 mounted thereto permitting filling of the legs with a particular material such as sand to permit positioning of the decoy in soft or frozen ground, as set forth in U S. Pat. No. 4,885,861. U.S. Pat. No. 4,689,913 sets forth a further example of a hunting decoy as illustrated in FIG. 2, wherein the decoy structure 4 utilizes a wire framework 5 to mount a decoy covering 6 thereon.

More specifically, the hunting decoy apparatus 10 of the instant invention essentially comprises a body housing 11 including an elongate head and neck portion 12 of a decoy configuration mounted to a forward end wall of the housing. A top portion of the housing is selectively covered by a right and left convex wing door 13 and 14 respectively. The wing doors 13 and 14 are in contiguous communication relative to one another along respective right and left contact closure lines 15 and 16 of the respective right and left wing doors 13 and 14. The first position of the wing doors in contiguous contact with one another along the respective contact closure lines 15 and 16, as illustrated in FIG. 4, whereupon separation of the wing doors in a second position is set forth in FIG. 7. The right wing door includes a right hinge edge 17 opposed to the contact closure line 15, wherein the left wing door includes a left hinge edge 18 separated from the left contact closure line 16. Accordingly, a plurality of right hinges 19 are mounted to the right hinge edge 17 with a plurality of left hinges 20 mounted to the left hinge edge 18. Right mesh screen 21 of a generally semi-elliptical configuration is formed through the right convex wing door 13 extending inwardly into the wing door from the right contact closure line 15, with a left mesh screen 22 extending inwardly into the left convex wing door 14 from the left contact closure line 16. The right and left mesh screens 21 and 22 each include a right and left mesh screen engagement edge 21a and 22a respectively overlapping the contact closure lines of each door and are coextensive with one another, whereupon closure of the mesh screens into the first position, as illustrated in FIG. 4, sets forth a viewing screen that a hunter may peer through when contained within the housing 11. The housing 11 defines a housing cavity 23 interiorly thereof (see FIG. 5 for example) including an "L" shaped seat member 24 mounted therewithin, with the "L" shaped seat member 24 including a horizontal leg 24a mounted to the housing floor 25, with a vertical leg 24b extending rearwardly and upwardly of the horizontal leg to underlie the head and neck portion 12. As illustrated, the mesh screen organization defined by the right and left mesh screens 21 and 22 Will overlie an intersection defined by the horizontal and vertical legs 24a and 24b to properly position the mesh screen relative to a hunter contained within the housing cavity 23.

Figure 6:
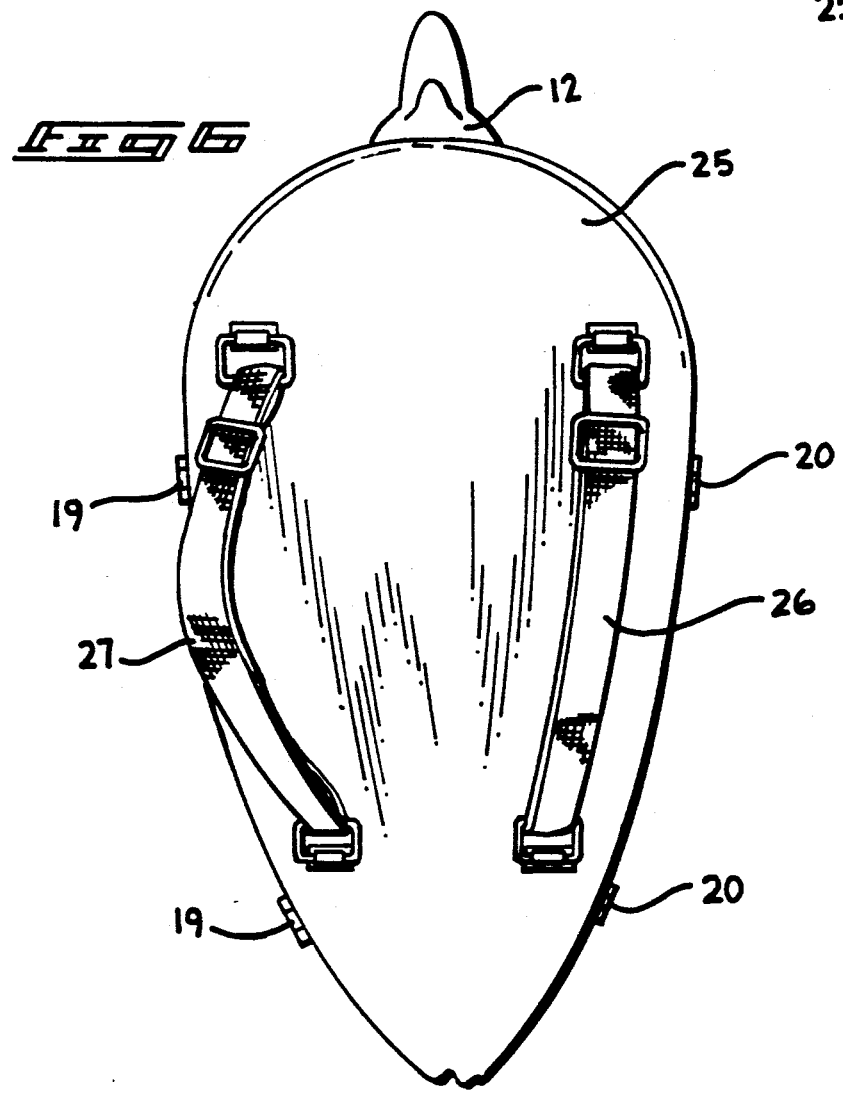
FIG. 6 is an orthographic bottom view of the instant invention.

FIG. 6 illustrates the use, if desired, of a respective first and second adjustable shoulder strap 26 and 27 mounted to an exterior surface of the housing floor 25 to permit transport of the organization by an individual in a backpack type arrangement. Further, a right and left elongate opening 28 and 29 (see FIGS. 3 and 5 for example) are directed through a rear wall of the housing 11 opposed to that of the head and neck portion 12 to permit a hunter to extend the hunter's legs therethrough for comfort and convenience, and to further effect stability to the organization when the hunter is positioned therewithin.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hunting decoy apparatus comprising,
    an elongate body housing, the body housing including a housing cavity interiorly thereof, the housing including a forward arcuate wall and a rear arcuate wall, with the cavity extending interiorly of the housing from the forward arcuate wall to the rear arcuate wall,
    and an elongate neck and head portion of a decoy configuration extending upwardly of the housing adjacent the forward wall,
and
an "L" shaped seat member mounted within the cavity, and the housing including a cavity floor extending from the forward wall to the rear wall coextensive with the housing, with the seat member defining a horizontal leg mounted to the housing floor and a vertical leg extending upwardly of the horizontal leg towards the forward wall,
and
the housing including an opening, with the opening including a right and left convex wing door pivotally mounted to the housing, with the right and left wing door overlying the opening in a first position,
and
wherein the right and left wing door are each of a convex configuration, with the right wing door defining a right contact closure line and the left wing door defining a left contact closure line, wherein the right and left contact closure lines are in contiguous continuous communication with one another in the first position,
and
wherein the right wing door includes a right hinge edge spaced from the right contact closure line, and the left wing door includes a left hinge edge spaced from the left contact closure line, and the right hinge edge includes a plurality of right hinge members mounted to the right wing door and the housing to pivotally mount the right wing door to the housing, and the left wing door includes a plurality of left hinges mounted to the left wing door and the housing overlying the left hinge edge to pivotally mount the left wing door to the housing,
and
wherein the right wing door includes a right mesh screen and the left wing door includes a left mesh screen, the right mesh screen and the left mesh screen extend from the respective right and left contact closure lines of the respective right and left wing doors and are coextensive relative to one another, and the right and left mesh screens overlying an intersection defined by the horizontal leg and vertical leg of the "L" shaped seat member when the right and left wing doors are in the first position,
and
wherein the right and left wing doors are pivotal about the respective right and left hinge edges to separate the right and left contact closure lines to a second position,
and
wherein the floor of the housing includes a first and second adjustable shoulder strap mounted to an exterior surface of the floor to permit securement of the apparatus to an individual for transport of the apparatus,
and
wherein the rear wall of the housing includes a right and left elongate opening directed through the rear wall to permit extension of a hunter's legs through the right and left elongate opening to impart stability to the organization in use and enhance comfort to the hunter when positioned within the cavity on the "L" shaped seat member.

* * * * *